(12) United States Patent
Yamamura (10) Patent No.: US 7,982,892 B2
(45) Date of Patent: Jul. 19, 2011

(54) INFORMATION PROCESSING APPARATUS AND CONTROL METHOD THEREOF, AND COMPUTER PROGRAM AND COMPUTER READABLE STORAGE MEDIUM

(75) Inventor: Shinichi Yamamura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1059 days.

(21) Appl. No.: 11/462,411

(22) Filed: Aug. 4, 2006

(65) Prior Publication Data
US 2007/0035766 A1  Feb. 15, 2007

(30) Foreign Application Priority Data

Aug. 9, 2005 (JP) ................................. 2005-231167

(51) Int. Cl.
*G06F 3/12* (2006.01)
(52) U.S. Cl. ...................................... 358/1.15
(58) Field of Classification Search .................. 358/1.15
See application file for complete search history.

(56) References Cited

U.S. PATENT DOCUMENTS

| | | | | |
|---|---|---|---|---|
| 6,369,909 | B1* | 4/2002 | Shima | 358/1.15 |
| 6,661,454 | B1* | 12/2003 | Hwang et al. | 348/231.1 |
| 6,943,906 | B2* | 9/2005 | Murata | 358/1.13 |
| 7,194,541 | B1* | 3/2007 | Ravindranath et al. | 709/225 |
| 2002/0046312 | A1* | 4/2002 | Nakamura | 710/301 |
| 2002/0103829 | A1* | 8/2002 | Manning et al. | 707/513 |
| 2002/0116291 | A1* | 8/2002 | Grasso et al. | 705/27 |
| 2003/0002056 | A1* | 1/2003 | Yamaguchi et al. | 358/1.2 |
| 2003/0002072 | A1* | 1/2003 | Berkema et al. | 358/1.15 |
| 2003/0033367 | A1* | 2/2003 | Itoh | 709/203 |
| 2003/0163341 | A1* | 8/2003 | Banerjee et al. | 705/1 |
| 2003/0182363 | A1* | 9/2003 | Clough et al. | 709/203 |
| 2004/0020389 | A1* | 2/2004 | Holmstead et al. | 101/484 |
| 2004/0227971 | A1* | 11/2004 | Clough et al. | 358/1.14 |
| 2004/0230646 | A1* | 11/2004 | Clough et al. | 709/203 |
| 2004/0239992 | A1* | 12/2004 | Kawai et al. | 358/1.15 |
| 2004/0246514 | A1* | 12/2004 | Clough et al. | 358/1.14 |
| 2005/0084113 | A1* | 4/2005 | Simpson et al. | 380/270 |
| 2005/0197967 | A1* | 9/2005 | Booth et al. | 705/62 |
| 2005/0198284 | A1* | 9/2005 | Bunn et al. | 709/225 |

FOREIGN PATENT DOCUMENTS

| | | |
|---|---|---|
| JP | 10-275064 | 10/1998 |
| JP | 2002-312146 A | 10/2002 |

OTHER PUBLICATIONS

The above foreign patent document was cited in a Aug. 2, 2010 Japanese Office Action, that issued in Japanese Patent Application No. 2005-231167.

* cited by examiner

*Primary Examiner* — Chan S Park
*Assistant Examiner* — Kenneth Kwan
(74) *Attorney, Agent, or Firm* — Cowan, Liebowitz & Latman, P.C.

(57) ABSTRACT

This invention controls a printer to download using either a nonsecure protocol or a secure protocol depending on as to whether or not the printer is included in a network segment to which an information processing apparatus generating print control information belongs. When, on an application executed by the apparatus, a desired data file stored in a server on the network is designated as an object to be printed, the apparatus acquires a printer port activated by a printer driver. The apparatus determines whether or not a destination IP address set to the printer port is included in the network segment inside an office. If the IP address is included in the network segment, HTTP is set as a protocol associated with file acquisition which is to be described in a job ticket. If not, HTTPS is set as a protocol associated with file acquisition.

6 Claims, 13 Drawing Sheets

```
<psf.InitalJobTichket Version="1"
        xmlns:psf=http://schemas.printer.co.jp/printing/prints_chemaframework
        xmlns:psk=http://schemas.printer.co.jp/printing/prints_chemakeywords
        xmlns:xsi=http://www.w3.org/2001/XMLSchema-instance
        xmlns:xs=http://www.w3.org/2001/XMLSchema
        xmlns:ns1=http://www.privatenamespace1.com>

<psf:Help type="psk:main"URI=http://help.main.PrinterIP/>

<psf:Feature name="psk:MediaSize">
   <psf:Help type="psk:context"URI=http://help.context.MediaSize.IPAddress/>
   <psf:Default name="A4"/>
   <psf:Option name="A4"/>
   <psf:Option name="A5"/>
   <psf:Option name="CustomMediaSize"/>
</psf:Freature>

<psf:Feature name="ns1:HalfTones">
   <psf:Help type="psk:context"URI=http://help.context.HalfTones.IPAddress/>
   <psf:Default name="ns1:Gradation"/>
   <psf:Option name="ns1:Gradation"/>
   <psf:Option name="ns1:ErrorDiffusion"/>
</psf:Freature>
....

</psf:JobTichket>
```

FIG. 4

```
<psf.InitalJobTichket Version="1"
        xmlns:psf=http://schemas.printer.co.jp/printing/prints_chemaframework
        xmlns:psk=http://schemas.printer.co.jp/printing/prints_chemakeywords
        xmlns:xsi=http://www.w3.org/2001/XMLSchema-instance
        xmlns:xs=http://www.w3.org/2001/XMLSchema
        xmlns:ns1=http://www.privatenamespace1.com>

<psf:Help type="psk:main"URI=http://help.main.PrinterIP/>

<psf:Feature name="psk:MediaSize">
   <psf:Help type="psk:context"URI=http://help.context.MediaSize.IPAddress/>
   <psf:Option name="A4"/>
</psf:Freature>

<psf:Feature name="ns1:HalfTones">
   <psf:Help type="psk:context"URI=http://help.context.HalfTones.IPAddress/>
   <psf:Option name="ns1:Gradation"/>
</psf:Freature>
....

</psf:JobTichket>
```

INFORMATION PROCESSING APPARATUS AND CONTROL METHOD THEREOF, AND COMPUTER PROGRAM AND COMPUTER READABLE STORAGE MEDIUM

BACKGROUND OF THE INVENTION

1. Field of the Invention

The present invention relates to a print technique of secure documents via a network.

2. Description of the Related Art

In recent years, various PCs and input and output apparatuses handle secure data via networks, the chances of confidential information leakage such as printing and distribution using printers, storage in individual PCs (personal computers), removal of information stored in USB storages, and the like is increasing. For this reason, importance is attached to security that prevents information leak, and various efforts are being made.

As one of such efforts, a scheme that encrypts secure data itself and allows only a user who has an access right to access such data is known. Also, a scheme that encrypts transmission data on a network and shares a decryption key by the sender and recipient, a scheme that manages access to a printer itself using user IDs and passwords, and allows to print only when a user is authenticated, and the like are available.

However, these systems provide security for local processing, and even when various schemes are combined, the load on a person who sets an access right becomes heavier or a security hole is generated due to omission of settings. Especially, it is difficult to prevent information leak by an access right holder.

To prevent such problems, a scheme called a secure document system in which a secure management server unifies management of PCs and input and input and output apparatuses connected to a network, and resulting high security is receiving a lot of attention.

The secure document system has the security management server as its characteristic feature that manages encrypted secure data and an access right. The PCs and input and output apparatuses connected to the network must be authenticated by the security management server as needed when they access encrypted secure data.

In the future, the opportunity of accessing and printing secure data in an office will increase not only in a meeting room which is not connected to the security management server via a network but also when one leaves the office.

On the other hand, when a document to be printed includes image data, the image data is not included in the document, but a URL indicating the location of that image data is described in a print control command called a job ticket (for example, Japanese Patent Application Laid-Open No. 10-275064). By utilizing such a job ticket, a printer outside the office can download image data stored in a server in the office, thus improving convenience.

However, the aforementioned prior art poses a problem when one accesses and prints secure data in a meeting room which is not connected to the security management server via the network or upon leaving the office. This is because a security hole must be formed in a WWW server equipped in the office to implement this.

Of course, the security hole is not desirable in terms of security against computer viruses, hacking, and the like.

In a method in which a WWW server for the outside is started up and required image data is downloaded from there only upon printing from a print control apparatus outside the office, not only extra equipment is required, but also tremendous manpower is required in management and maintenance of this WWW server. When one wants to download image data from the server in the office to a printer outside the office, the image data may be falsified since it goes through the external Internet.

SUMMARY OF THE INVENTION

The present invention has been made to solve the above problems, and has as its object to provide a technique which issues a print instruction (job ticket) that describes a download protocol of a document depending on the location of a printer on a network, and can attain high convenience and high security at the same time.

In order to achieve the above object, an information processing apparatus according to the present invention comprises the following arrangement. That is, there is provided an information processing apparatus which designates a desired data file to be printed that is stored in a server on a network, and outputs print control information that describes a file name with a path in the server of the data file toward a printer port that specifies a printer as a print destination, comprising:

determination means for determining if an output destination indicated by the printer port is included in network segments to which the server belongs;

first print control information generation means for, when the determination means determines that the output destination is included in the network segments, generating print control information which describes that the data file specified by the file name with the path is to be downloaded from the server using a nonsecure protocol;

second print control information generation means for, when the determination means determines that the output destination is not included in the network segments, generating print control information which describes that the data file specified by the file name with the path is to be downloaded from the server using a secure protocol; and output means for outputting the print control information generated by one of the first control information generation means and the second control information generation means to the printer port.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

Figure 1:
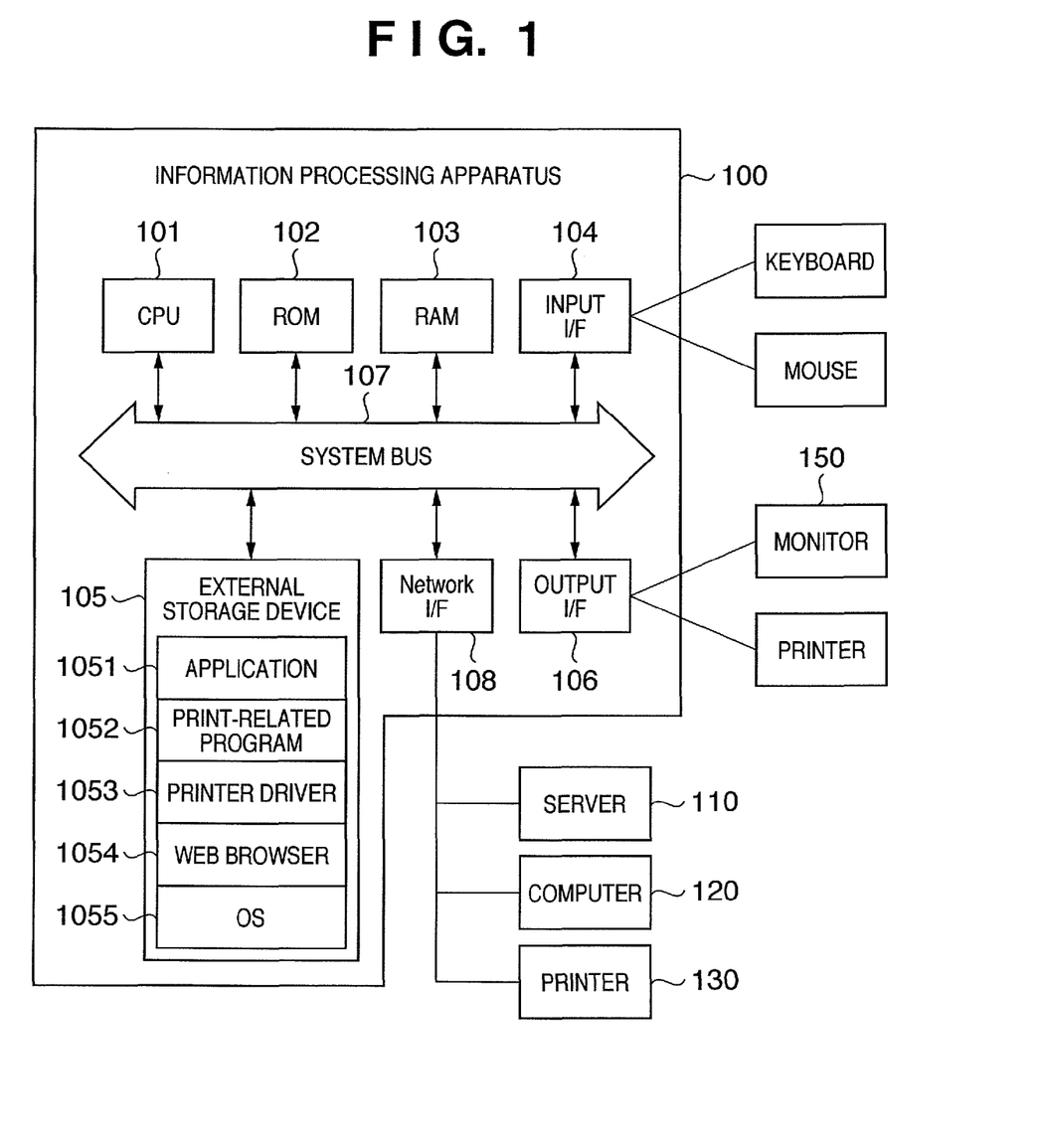
FIG. 1 is a block diagram of a printing system.

FIG. 1 is a block diagram of a general print processing system. FIG. 1 especially shows the block diagram of the arrangement in an information processing apparatus 100 such as a personal computer or the like.

A CPU 101 controls the entire apparatus in accordance with programs stored in a ROM 102, RAM 103, or external storage device 105. The ROM 102 is a read-only memory which stores a BIOS and boot program. The RAM 103 serves as a work area of the CPU 101, and stores an operating system (OS), application programs, and a printer driver in this embodiment, which are executed by the CPU 101.

The external storage device 105 is a large-capacity storage device such as a hard disk drive or the like, and records an operating system (OS) 1055 and application software 1051. Also, the external storage device 105 stores a print-related program 1052, printer driver 1053, and Web browser 1054. An input device such as a keyboard, mouse, or the like is used by the user to input various instructions via an input I/F 104. An output I/F 106 is an interface which is used to externally output data, and outputs data to a monitor 150 and printer. Reference numeral 107 denotes a system bus which performs data transfer among respective processing units. A network I/F 108 can exchange information with a server 110, another information processing apparatus 120, printer 130, and the like from the information processing apparatus 100 via communication media such as an intranet, the Internet, and the like.

In the above arrangement, when the power switch of the information processing apparatus 100 is turned on, the CPU 101 executes the boot program in the ROM 102, loads the OS from the external storage device 105 onto the RAM 103, and begins to serve as an information processing apparatus.

Figure 2:
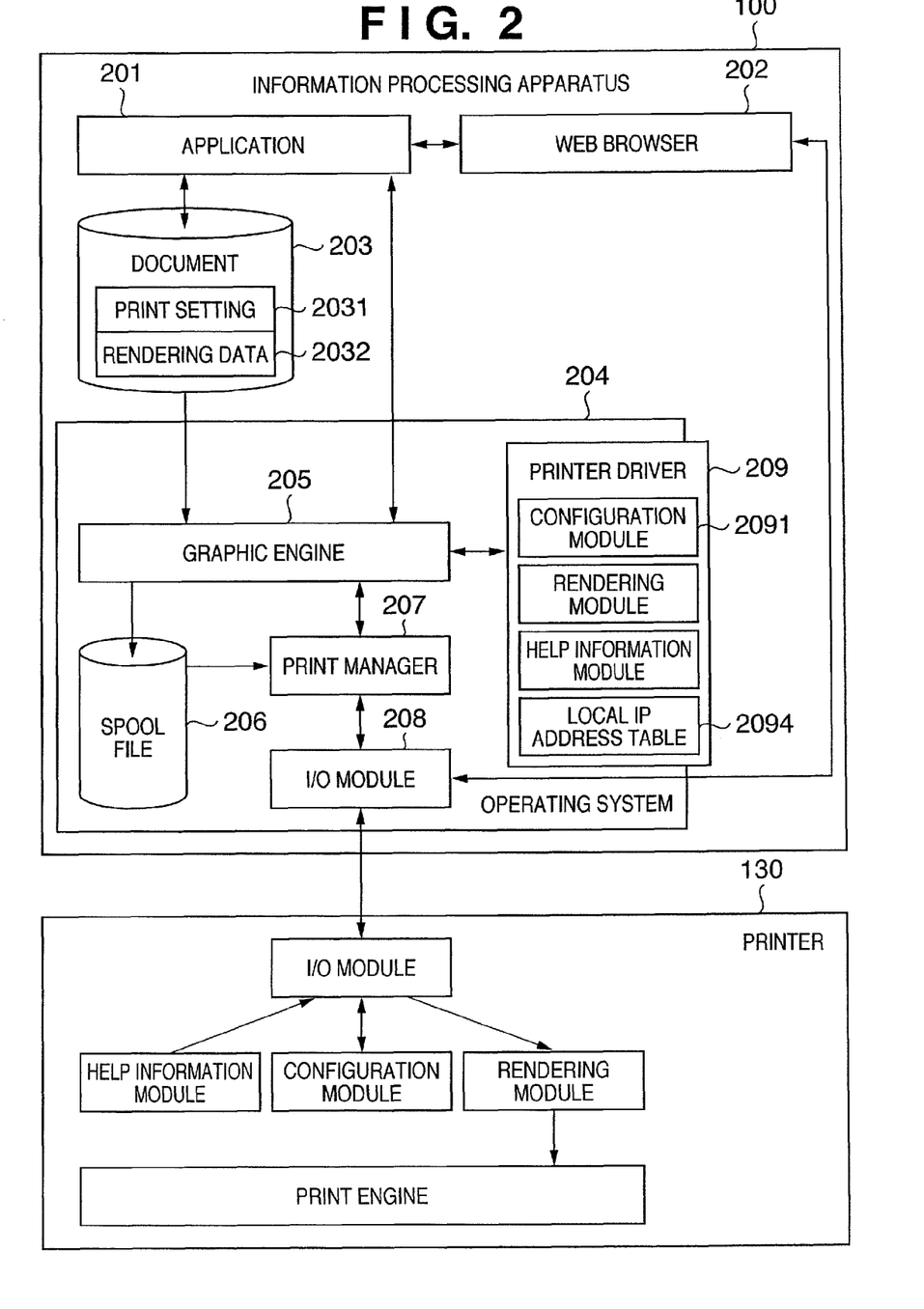
FIG. 2 is a block diagram for explaining the arrangement of the printing system and print data generation.

FIG. 2 shows the module arrangement of the print processing system when the OS, application, and printer driver are loaded onto the RAM 103, as described above.

The user executes print processing of a document 203 whose creation or edit processing is underway using a GUI which is displayed on the monitor 150 and is presented by an application program 201 using the input device such as a keyboard, mouse, or the like.

When the user executes the print processing, the application 201 understands a user's print operation, and launches a printer driver 209 corresponding to a printer based on a print setting 2031 of the document and rendering data 2012 of the document contents. After that, the application 201 notifies an operating system (OS) 204 of the print processing.

The OS 204 performs rendering on a spool file 206 and that on the designated printer driver 209 via a graphics engine 205. In response to this, the printer driver 209 converts data into a data language that can be understood by the printer, and a print manager 207 performs schedule management of the print processing from respective applications. The print manager 207 transmits print job data to the printer 130 via an I/O module 208 when the printer is ready to print. In this way, the print operation is executed.

A configuration module 2091 of the printer driver generates initial values of the print setting 2031 of the document. However, the user can change and set the print setting to obtain a final print result that he or she wants using a user interface of an application or the printer driver. The print setting includes two different formats. One format is a data structure in a binary data format called DEVMODE, and is used in a conventional print system. The other format is text data in a markup language XML format which is called a job ticket and uses tags. Since the job ticket format adopts text data, it has readable/editable/addable features, and it is expected that the print setting format gradually transits from the conventional DEVMODE format to the job ticket format. The print setting format to be selected depends on the specifications of the printer drivers and OS, and the support states of applications.

The DEVMODE structure which is prevalent in the conventional system is roughly configured by two setting regions. One setting region is used to set common basic information defined by the OS, and is called a public region. The other setting region can be freely expanded by the printer driver 209 corresponding to the printer, and is called a private region. The contents of information included in the public region are open to the public as the format of the OS, and the setting can be changed from every applications. The contents of this region can be designated from a page setting dialog of each application. As typical setting items, a paper size, paper orientation, and the like are known.

On the other hand, the private region (expanded region) describes further detailed settings, and cannot normally be set and changed from an application. Only the printer driver 209 can set and change the private region. Hence, the configuration module 2091 of the printer driver has a user interface (GUI) used to set this private region, and allows to make a print setting of the expanded region using that interface.

Setting items in this private region include ON/OFF of stapling, the position when stapling is ON, and the like.

As described above, when the DEVMODE structure as a part of the document 203 is carried to an environment where the printer driver that sets the structure does not exist, there is no means that allows the user to know information stored in the private region of the print setting 2031 appended to the document in such environment. Hence, the conventional document which saves information as the DEVMODE structure is premised on that editing and addition of functions of the print setting, and reference to help information are made in only the environment in which the printer driver 209 exists.

Figure 3:
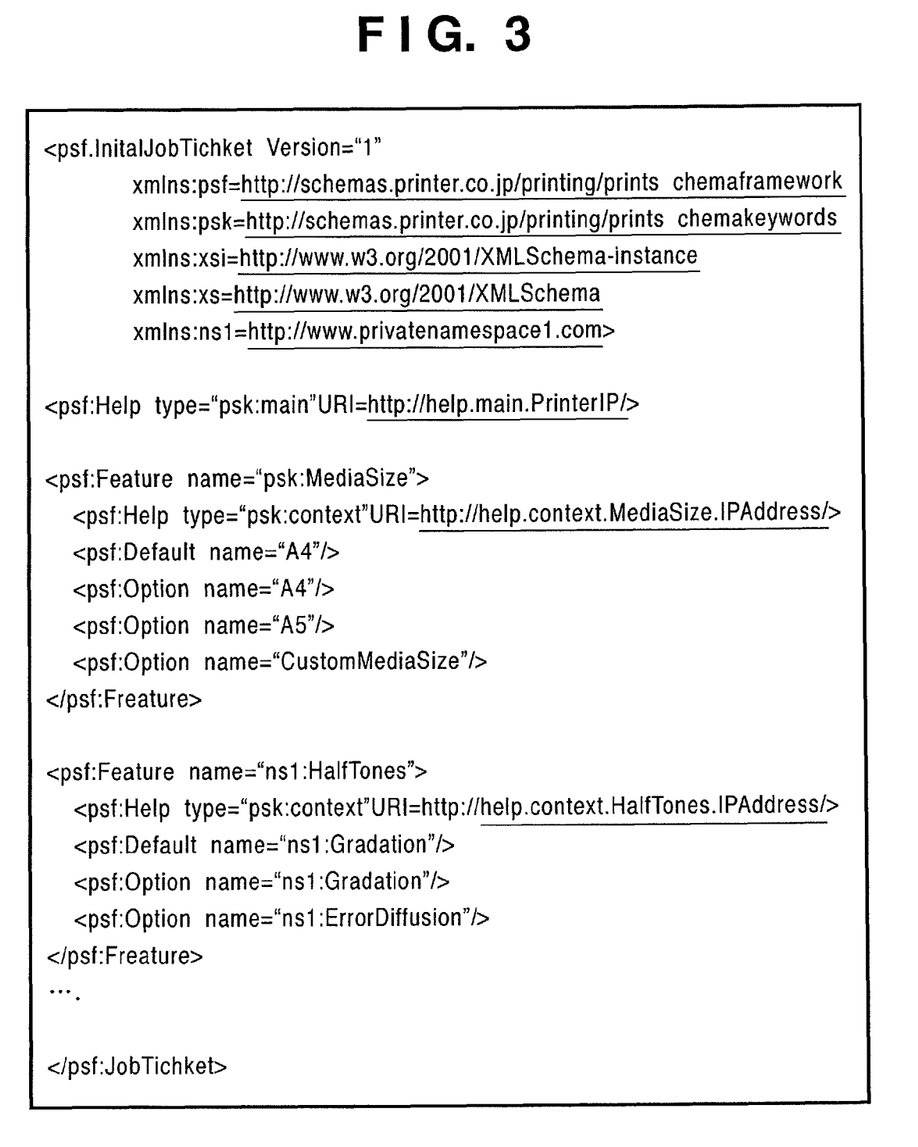
FIG. 3 shows a description example of an "initial job ticket" in an XML format, which saves print settings in a computer.
Figure 4:
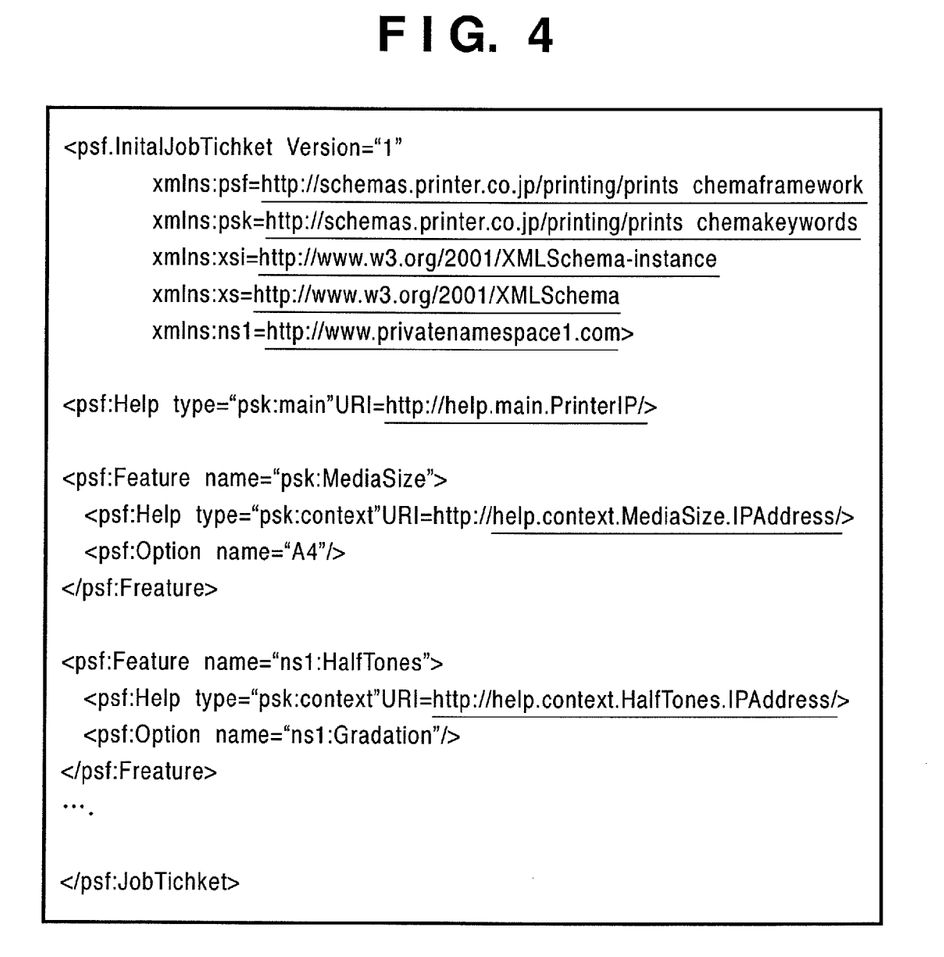
FIG. 4 shows a description example of a "setting job ticket" in the XML format, which saves print settings in the computer.

FIG. 3 shows an initial setting job ticket indicating a list of print setting items which can be selected by the printer, and FIG. 4 shows a setting job ticket which saves the print setting to be applied to a document.

As in the DEVMODE structure, both the job tickets include public and private regions. However, in a job ticket described in the XML format, respective regions are not separated by boundary lines unlike in DEVMODE. These regions are distinguished by a mechanism which separates the internal structure of tags into zones which are called namespaces.

Each namespace is designated as a prefix by each tag, and a tag which has no prefix is handled as that which does not belong to the namespace. The prefix is attached before a colon (:) symbol, and is described like "psf:Feature".

The job ticket in FIG. 3 includes five namespaces, which respectively play different roles. A psf namespace is a print schema framework which defines the framework of the job ticket. In order to provide a structure established as the job ticket, this namespace defines basic tags such as "Feature", "Option", and "Value". These tags are defined so that "Feature" represents a print function, "Option" represents options of the print function, and "Value" represents element values.

A psk namespace defines keywords of the job ticket in the public region. Practical keywords include "MediaSize" used to designate a paper size, and the like. The psf namespace and psk namespace are defined by the OS in the form of schemas which are open to the public, and an application can freely lay out data based on the definitions. An xsi namespace and xs namespace are generally defined as the specifications of an XML schema. The xsi namespace defines embedded attributes and instances of the XML schema. The xs namespace defines prescribed attributes of the XML schema. An ns1 namespace is that uniquely expanded by the printer driver. This namespace is used to describe printer- or vendor-dependent functions such as "Halftone", and the like.

The initial setting job ticket shown in FIG. 3 cites a list of functions implemented by the printer, and options selectable for individual functions. For example, in FIG. 3, a function "MediaSize" indicates that "A4", "A5", and "CustomMediaSize" indicating a user-defined size are selectable. Also, a tag "Default" represents an appropriate option in an initial state in which no selection is made, and indicates "A4" as a default for the function "MediaSize".

FIG. 4 shows a setting job ticket which holds a setting to be actually applied to a document from the option list of the initial setting job ticket in FIG. 3. Options are deleted from respective functions while leaving options selected by the user from the option list described in FIG. 3. In this example, "A4" is selected for the function "MediaSize".

HTTPS (Hyper Text Transfer Protocol over SSL) will be described below. HTTPS is a protocol specified by adding a data encryption function based on SSL to HTTP as a protocol used to exchange data between a Web server and client (Web browser or the like). This protocol aims at secure exchange of information associated with privacy, credit card numbers, and the like by encrypting a communication between the server and browser.

SSL is short for Secure Sockets Layer, and is a protocol of a procedure for encrypting and exchanging data. Normally, the Web server and browser communicate with each other using the protocol called HTTP (HyperText Transfer Protocol). HTTP has no function of preventing "wiretap" by encrypting a message or preventing "spoofing" by authenticating the Web server. For this reason, SSL (Secure Sockets Layer) has been developed since Netscape Communications and Weblogs, Inc. propounded as a protocol used to make secure communications on the Internet. Netscape Communications and Weblogs, Inc. determined the specifications up to SSL version 3.0, and many current protocols that access the Internet use SSL 3.0. After that, SSL was standardized by the IETF, and was published as TLS (Transport Layer Security) 1.0 in RFC2246.

Positioning of the SSL protocol will be described below.

Figure 5:
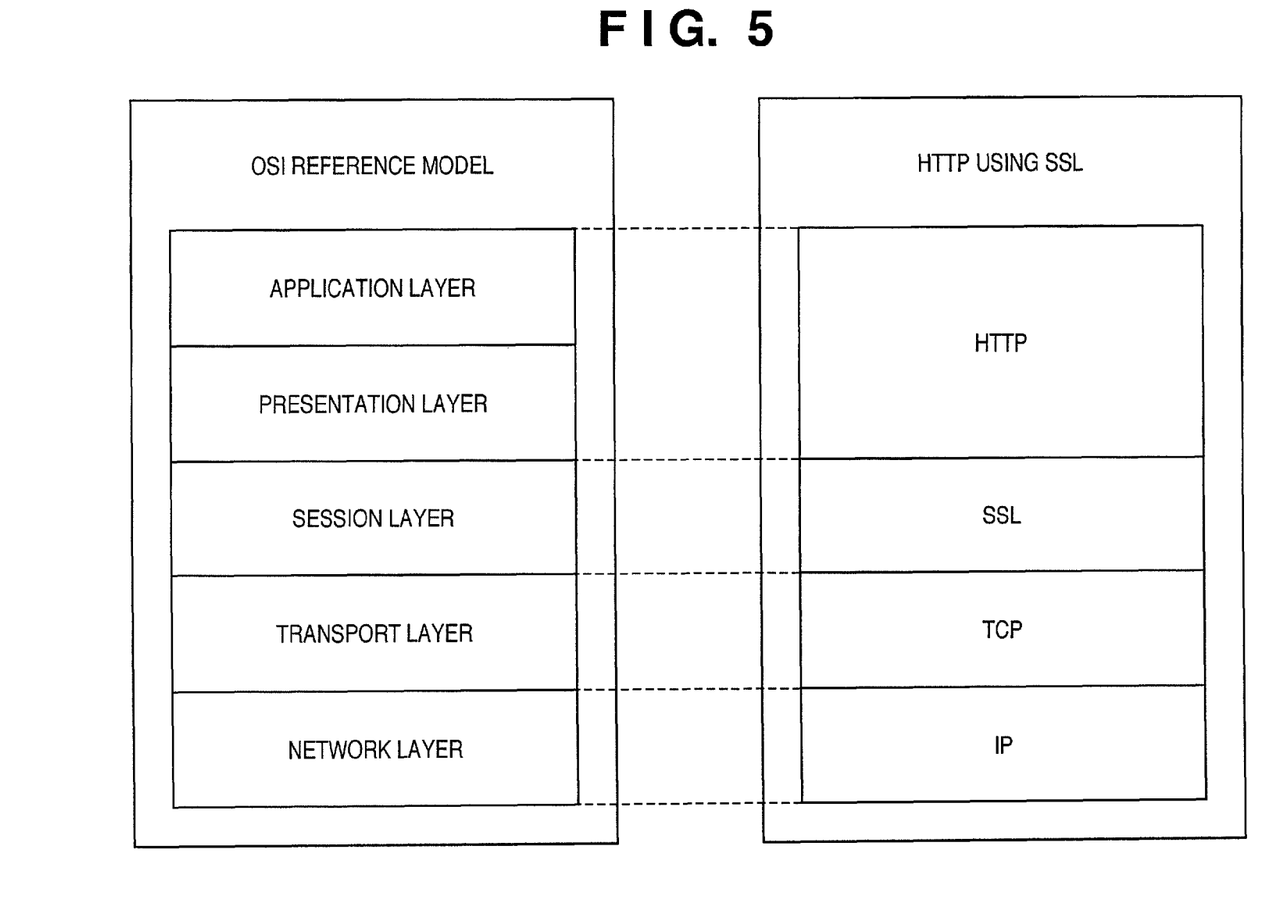
FIG. 5 shows an SSL protocol in an OSI reference model.

As shown in FIG. 5, SSL is positioned as a protocol located in a session layer. For this reason, SSL can be utilized from all application layers and presentation layers (HTTP/TELNET/FTP/POP, etc.) that uses the TCP/IP protocol as the lower layer.

Figure 6:
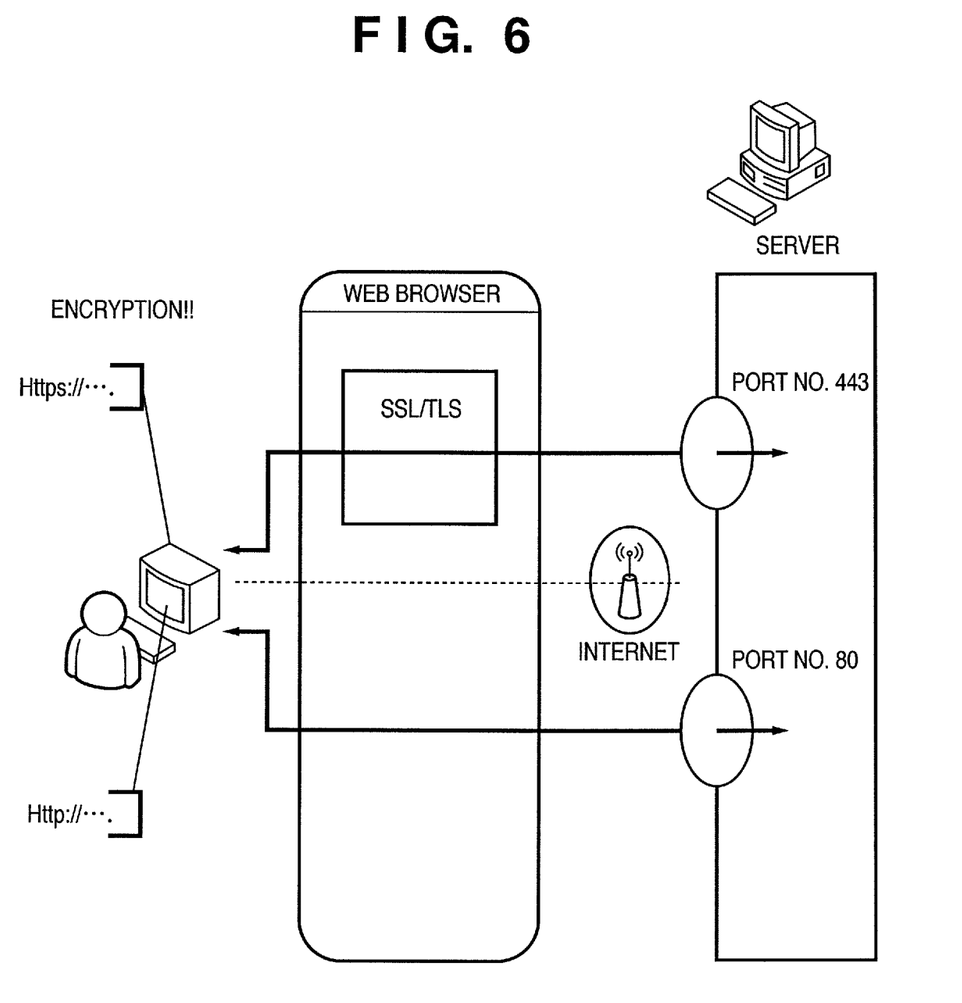
FIG. 6 shows the difference between protocols of HTTP and HTTPS.

As shown in FIG. 6, the browser (home page browsing software) discriminates "normal HTTP" and "HTTP using SSL" by URL differences (http:// . . . , and https:// . . . ).

For this reason, when a URL is described as "http:// . . . ", the browser directly makes a TCP/IP communication with the server without using any SSL function. When a URL is described as "https:// . . . ", the Web browser starts a TCP/IP communication via its own SSL function. In default settings, the server side assigns TCP port No. 80 to a request "http:// . . . " received from the browser, and assigns port No. 443 to "https:// . . . ", thus discriminating these requests.

The job tickets and the difference between HTTP and HTTPS have been described. A description of this embodiment will be given using FIG. 7 and subsequent figures.

Figure 7:
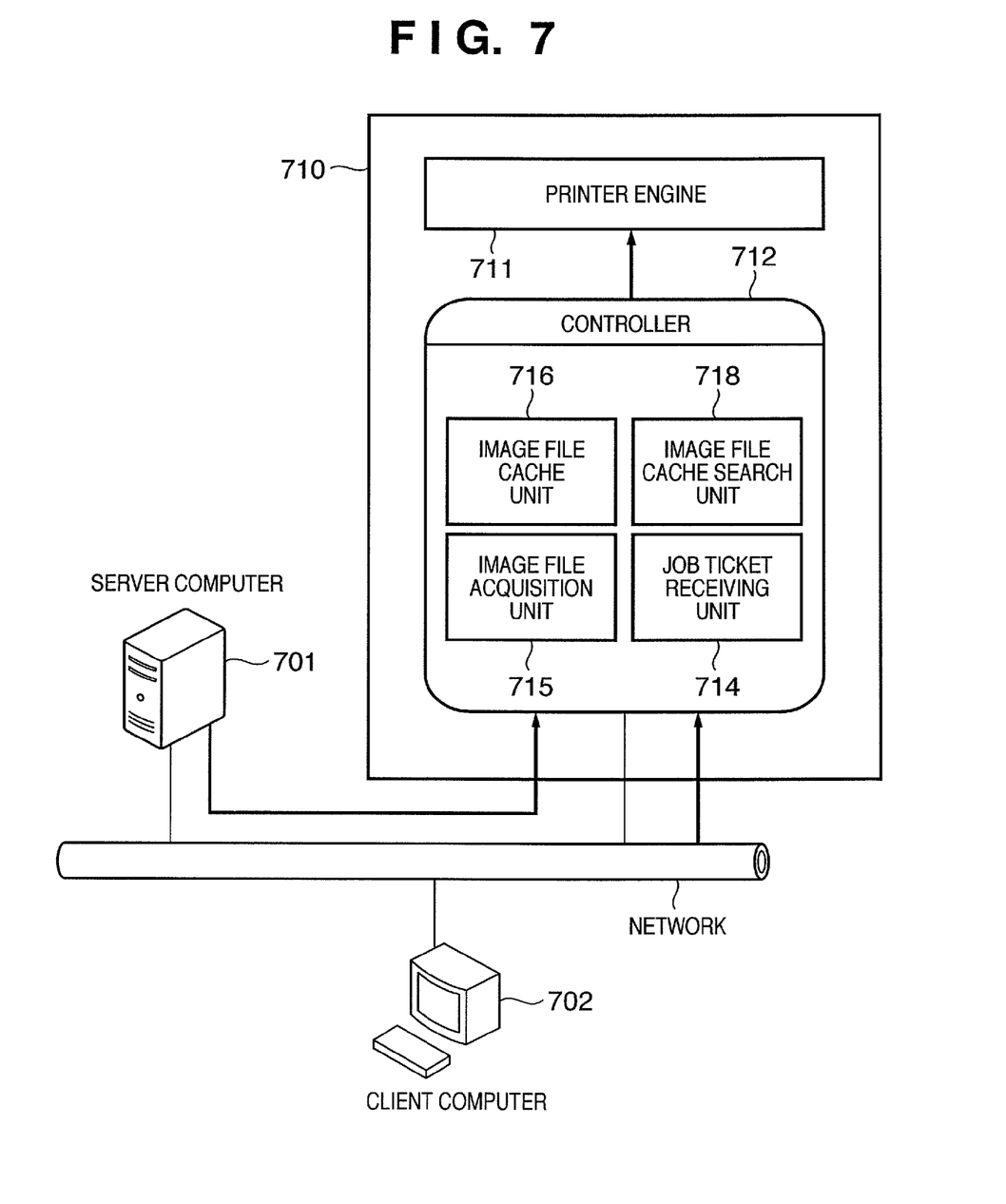
FIG. 7 is a block diagram showing the arrangement of an entire print control system according to an embodiment of the present invention.

FIG. 7 is a block diagram showing the arrangement of a print control system and that of a printer in this embodiment.

This system comprises a server computer 701 having a WWW function, a client computer 702 which generates a print job including a job ticket (print control information), and a printer 710 which communicates with these computers. The client computer 702 has substantially the same arrangement shown in FIGS. 1 and 2.

The printer 710 comprises a printer engine 711 which actually executes print processing, and a controller 712 which controls the entire printer. In this embodiment, the printer engine 711 comprises an LBP engine, but other printer engines such as an ink-jet printer engine may be used.

The controller 712 has a job ticket receiving unit 714 which receives a job ticket from the client computer 702. The job ticket describes the address of an image file on the server computer 701, the size of the image file, print parameters such as a reduction/enlargement ratio and the like, and so forth.

The controller 712 has an image file acquisition unit 715 which acquires an image file to be printed from the server computer 701 based on the address of the image file designated by the job ticket. This image file acquisition unit 715 executes processing for generating bitmap data which can be printed by the printer engine 711 based on the job ticket and the image file. The controller 712 executes processing for outputting the generated print data to the printer engine via a printer engine interface (I/F) (not shown).

The controller 712 has a cache function of an information file. That is, the controller 712 comprises an image file cache unit 716 which temporarily stores an image file acquired by the image file acquisition unit 715, and an image file search unit 718 which searches an image file cache memory for an image file designated by the address of the job ticket. In this way, a print control system which can execute high-speed print processing of an image file appended by the user at the client computer 702 can be realized.

Figure 8:
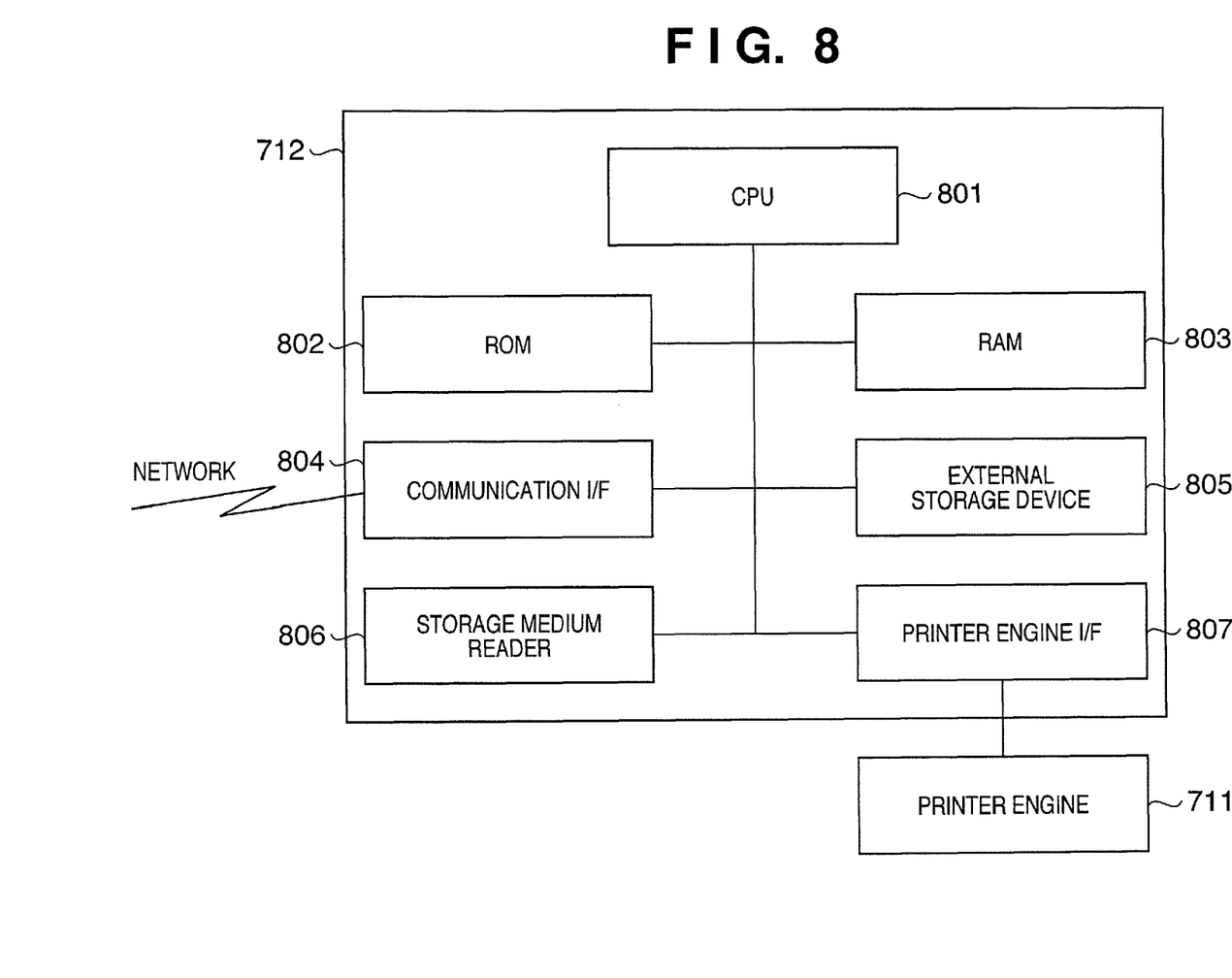
FIG. 8 is a block diagram showing the hardware arrangement of a printer according to the embodiment of the present invention.

FIG. 8 is a block diagram is a block diagram showing the hardware arrangement of the controller 712 in the printer 710. The controller 712 comprises a CPU (central processing unit) 801, a ROM 802 which stores programs to be executed by the CPU 801, and a RAM (random-access memory) 803 which provides a work area of the CPU 801 and an area used to rasterize print image data. The controller 712 has a communication interface (I/F) 804 which is used to communicate with the network, an external storage device 805 which temporarily stores print data, a storage medium reader 806 for a memory card or the like, and a printer engine I/F 807.

The CPU 801 receives a job ticket from the communication interface 804 and analyzes its contents in accordance with the program stored in the ROM 803. The CPU 801 receives data such as an image file and the like from the server 701 according to a URL description character string described in that job ticket, and stores the received data in the external storage device 805. The CPU 801 generates print bitmap image data based on the image file stored in the external storage device 805 according to the description of the job ticket, and outputs it to the printer engine 711 via the printer engine interface 807 to control the printer engine 711 to print.

When a storage medium is set in the storage medium reader 806, the CPU 801 executes the above processing based on a job ticket stored in that storage medium. That is, a job ticket can be input from both the network and a memory card.

Figure 9:
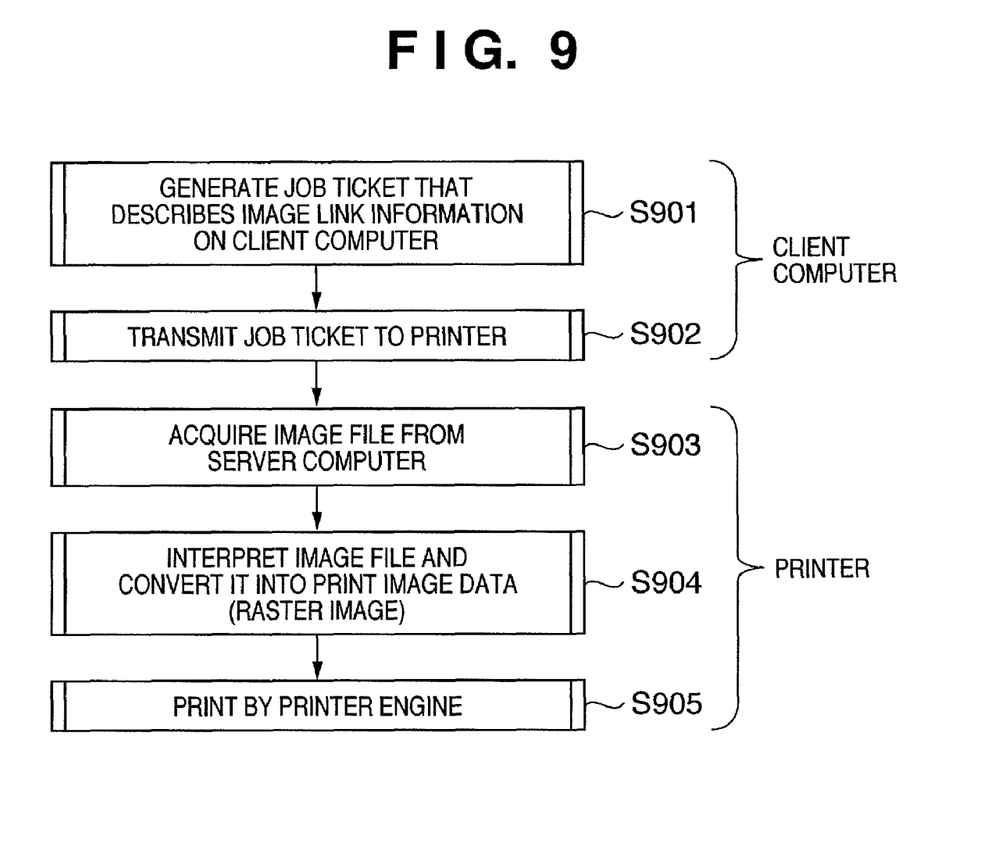
FIG. 9 is a flowchart showing the processing sequence of a client computer and the printer according to an embodiment of the present invention.

FIG. 9 shows the procedures of the print process in this embodiment. This print process will be described below using the functional block diagram of FIG. 7.

In step S901, the user launches a browser program on the client computer 702 to display images stored in the server 701, designates a desired image file from them, and executes print processing. As a result, a printer driver of the client computer 702 is launched. The printer driver acquires a URL indicating the location of the image file to be printed from the browser program, prompts the user to set conditions associated with printing, and generates a job ticket according to the set conditions. The job ticket is generated at that time according to the location of the printer which actually prints. Upon completion of generation of the job ticket, the flow advances to step S902, and the job ticket is transmitted (output) toward the printer designated by the user.

The printer 710 receives the job ticket, which is transmitted, as described above. Upon reception of the job ticket, the printer 710 analyzes its contents, searches for a description of the URL of the image file to be printed, and acquires the image file by accessing the server 701 according to that URL in step S903.

The flow advances to step S904, and the printer 710 interprets the received image file (normally encoded by PDF, JPEG, or the like) to convert it into print image data. After that, in step S905 the print image data is output to the printer engine 711, thus executing the print processing.

As described above, since transmission of the image file on the network can be decreased compared to the conventional print process, the network traffic can be reduced. In this embodiment, the need for acquiring all image files by the client computer can be obviated, and the time required until generation of a printed matter can be greatly reduced, thus realizing high-speed processing.

Figure 10:
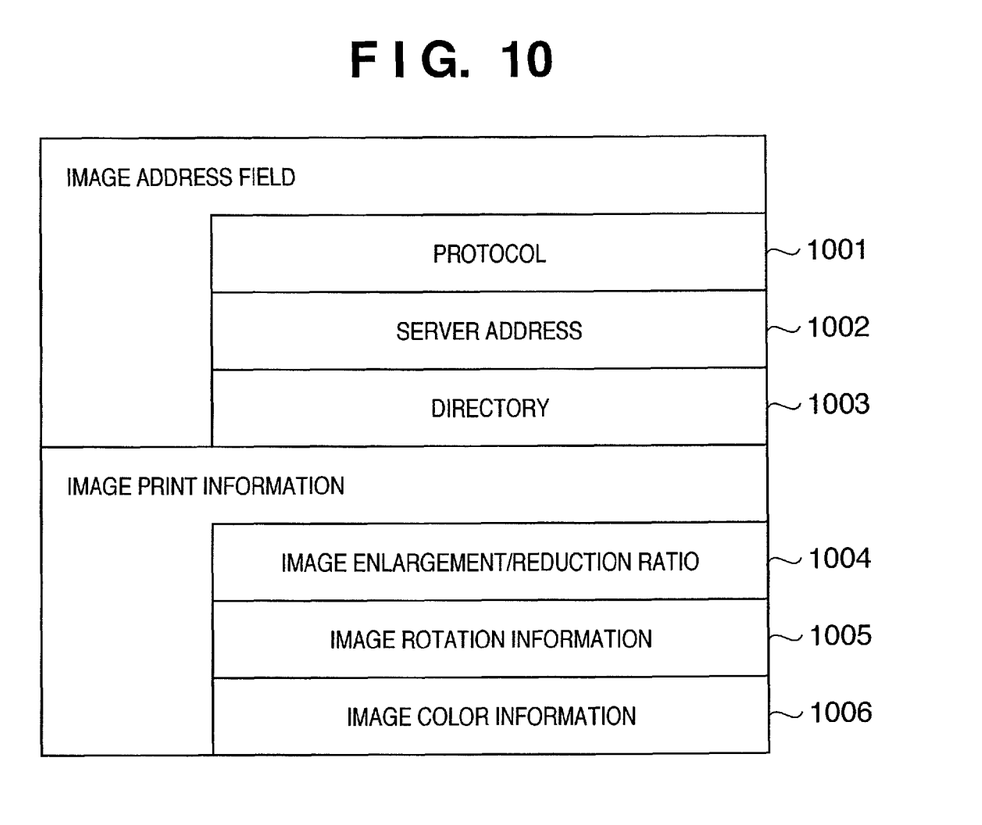
FIG. 10 shows an example of a job ticket according to an embodiment of the present invention.

FIG. 10 shows an example of the structure of a job ticket generated by the client computer 702. The job ticket includes an image address field and image print information (print condition information).

The image address field stores a protocol (1001) used in a communication with the server computer 701. Also, the image address field stores a server address (1002) of the server computer on the network, and a directory and file name (1003) (file name with a path) of an information file on the server. Note that character strings of the protocol, server address, and file name with a path are normally integrally described in HTTP or HTTPS.

For example, "http://abcdefg.co.jp/hijk/image001.jpg" indicates that the server name is "abcdefg.co.jp". Also, it indicates that a file "image001.jpg" stored in a directory "hijk" of that server exists. Furthermore, "http://" indicates that the file is requested and received by the HTTP protocol.

The image print information stores an enlargement/reduction ratio (1004), rotation information (1005), color information (1006), and the like of an image. In addition to these kinds of information, a print paper size and type may be included.

The protocol 1001 used in a communication with the server computer will be described below. The protocol to be stored is one of "http:// . . . " and "https:// . . . " in this embodiment. As described above, https is a protocol with high security which uses SSL (Secure Sockets Layer), while http is a normal exchange protocol without any encryption.

How the printer driver of the client computer 702 determines one of "http:// . . . " and "https:// . . . " will be described below.

As a precondition, a printer driver normally manages an output destination of print data using a concept "port".

For example, when the OS which runs on the client computer 702 is Windows® available from Microsoft Corporation, printer ports include LPT1, LPT2, . . . , COM1, . . . , USB001, FILE, and IP address. Of these ports, LPT#, COM#, and USB# indicate local physical interfaces of the client PC. LPT1 generally indicates a parallel interface based on the Centronics specifications, COM# indicates an interface such as RS-232C or the like, and USB indicates Universal Serial Bus. Since a plurality of identical local physical interfaces often exist, suffices "1" and "2" are assigned for descriptive purposes. The printer port "FILE" is used when a storage device (e.g., HDD or flexible disk) is selected as the output destination of print data (job ticket).

The printer port "IP address" can be additionally registered as many as the user wants, and means an IP address of a printer on the network. That is, when "IP address" is designated as a printer port, a job ticket is output from the network interface, and is transmitted toward the printer on the network specified by the IP address.

The printer driver which runs on the client computer 702 determines "http:// . . . " or "https:// . . . " to be described in a job ticket according to the processing shown in FIG. 11. A description will be given below with reference to FIG. 11.

Figure 11:
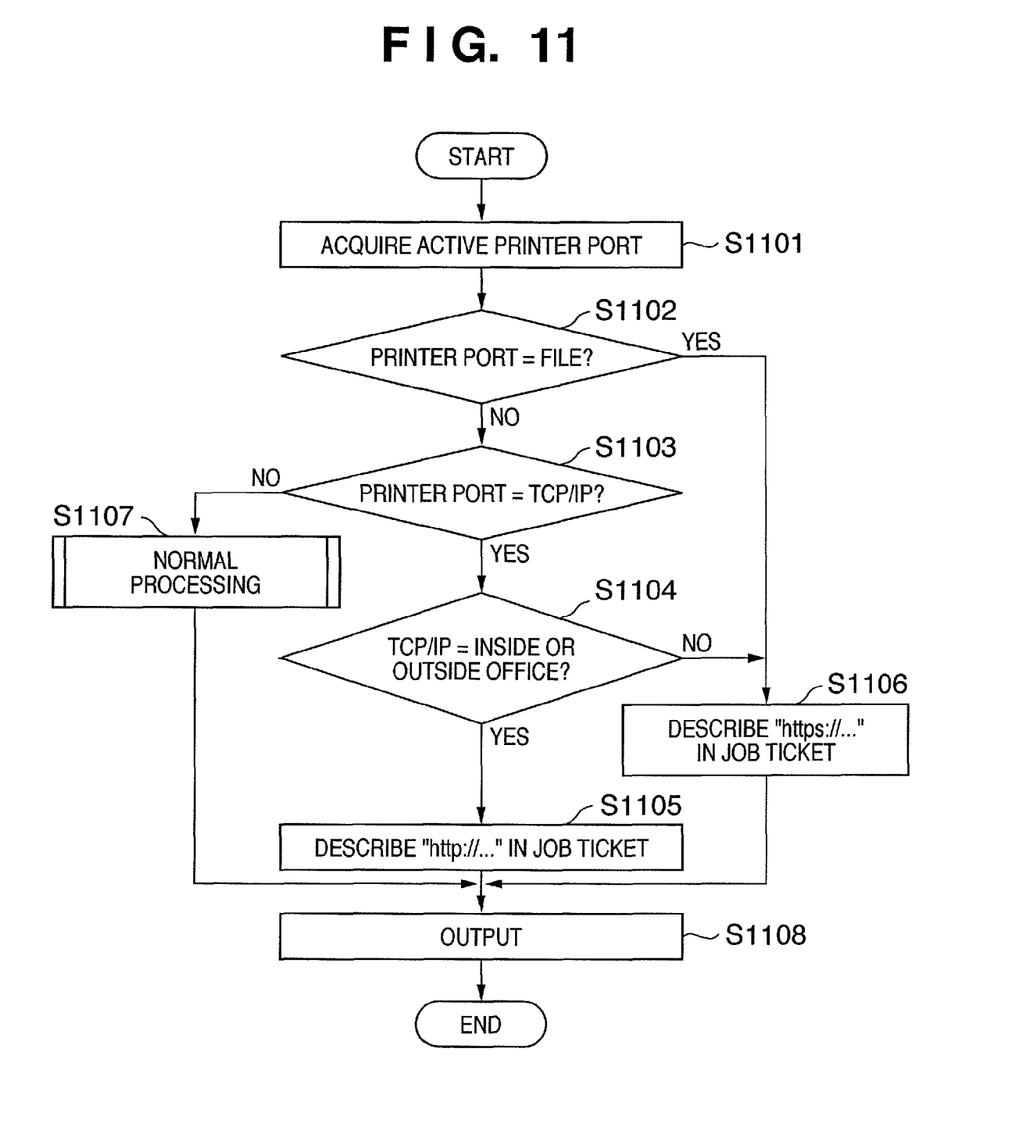
FIG. 11 is a flowchart showing the processing sequence of a printer driver which is executed on the client computer according to an embodiment of the present invention.

Upon execution of print processing by an application, printer port information which is currently selected is acquired using a Windows® API (step S1101).

It is then checked in step S1102 if the printer port is "FILE". If the printer port is "FILE", the flow advances to step S1106 to describe "https:// . . . " as the protocol of the URL in the job ticket (the reason for this will be described later).

If it is determined that the printer port is not "FILE", the flow advances to step S1103 to check if the printer port includes a TCP/IP address. That is, it is determined if the job ticket is to be transmitted to the printer on the network.

If No is determined in step S1103 (e.g., if LPT1 or the like is designated as the printer port), the flow advances to step S1107 to execute normal processing. Note that the normal processing means acquisition of an image file and generation of print data according to the image file since the printer is locally connected to the client computer when the flow advances to step S1107.

If Yes is determined in step S1103, i.e., if it is determined that the print processing is executed using the printer on the network, the flow advances to step S1104 to determine if the printer as a transmission destination exists inside or outside the office. This determination processing is implemented by checking whether or not an IP address range which is registered in advance in a local IP address table 2094 (see FIG. 2) as that for printers inside the office (the IP address range of a server 1201) includes the IP address of the printer as the transmission destination. This determination processing is done premised on that the server is equipped inside the office. More specifically, it is determined if the server and printer belong to the same network (inside the office). If the printer as the transmission destination exists within the network (inside the office) to which the server belongs, since the image file does not go through the external Internet or the like, there is a less fear of falsification of the image file. Hence, nearly no problem is posed when the image file is downloaded from the server to the printer using a nonsecure protocol. However, if the printer exists outside the network (outside the office) to which the server belongs, since the image file goes through the external Internet or the like, there is a fear of falsification of the image file. Hence, in such case, although time is required more than the communication using the nonsecure protocol, the image file is downloaded from the server to the printer using a secure protocol.

If it is determined that the printer as the transmission destination exists outside the office, "https:// . . . " is set as the protocol of the job ticket (step S1106). If it is determined that the transmission destination is the printer inside the office, "http:// . . . " as the protocol without any encryption is described in the job ticket (step S1105).

Finally, the flow advances to step S1108 to output the generated print data or job ticket to the active printer port.

The determination processing has been described. The reason why "https:// . . . " is used as the protocol to be described in the job ticket when the transmission destination is the printer outside the office or "FILE" is selected as the printer port will be explained below.

Figure 12:
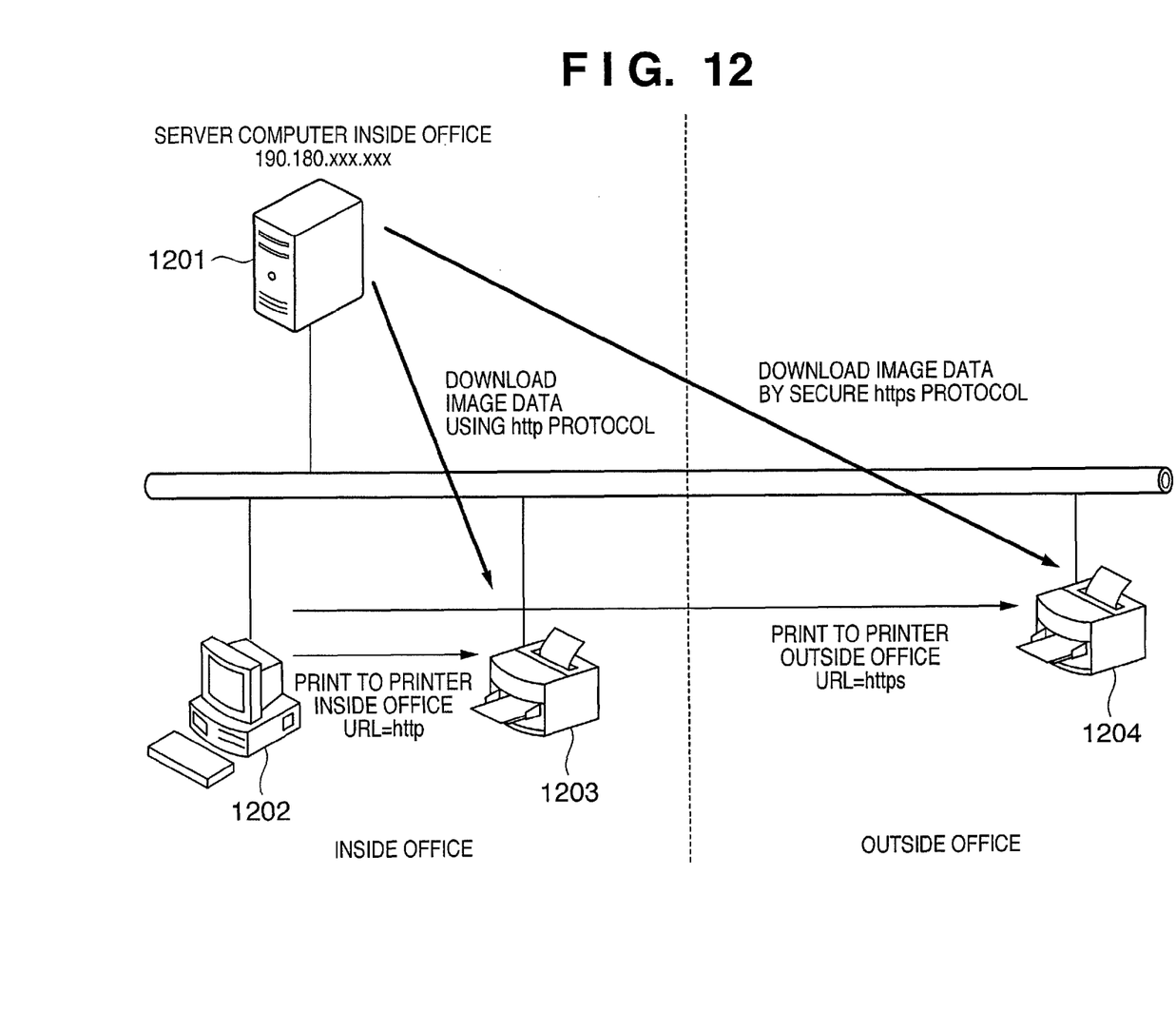
FIG. 12 shows different print flows due to different IP addresses.

FIG. 12 is a view showing generation of a job ticket and its flow according to this embodiment. The central broken line in FIG. 12 indicates a boundary line between inside and outside the office.

At this time, a subset address "190.180.xxx.xxx" is a boundary line that divides between inside and outside the office. That is, a subset address other than "190.180" indicates outside the office. At this time, the server computer which stores image files is equipped inside the office. A client computer 1202 executes print processing, and sends a job ticket that describes the location information of an image file stored in a server computer 1201 to a printer 1203 equipped inside the office. As a result, the printer 1203 inside the office downloads a desired image file from the server computer using the "http://" protocol without any encryption, and executes the print processing. This is because no exchange protocol with encryption is required upon downloading an image file from the server computer since the office environment is formed by the intranet with high security inside the office.

A case will be explained below wherein the client computer 1202 executes print processing using a printer 1204 located outside the office. At this time, since the printer outside the office accesses the server computer inside the office, an image file is downloaded using the public Internet with low confidentiality of information. For this reason, in such case, the printer 1204 located outside the office downloads an image file from the server computer using the "https://" exchange protocol with encryption, and executes print processing. In this way, a secure communication can be assured between the printer 1204 outside the office and the server 1201.

On the other hand, when print processing is executed while "FILE" is selected as the printer port, a dialog box (not shown) which inquires the user of a storage medium which is used to save a job ticket of that print processing is displayed, and prompts the user to select the storage medium. Therefore, the user can designate a portable storage medium such as a USB memory card, a writable CD-ROM or DVD, and the like as the storage destination. Since such medium is portable, the printer which has the arrangement (storage medium reader 806) shown in FIG. 8 can print out the contents of the storage medium which stores the job ticket irrespective of its location (inside or outside the office).

Figure 13:
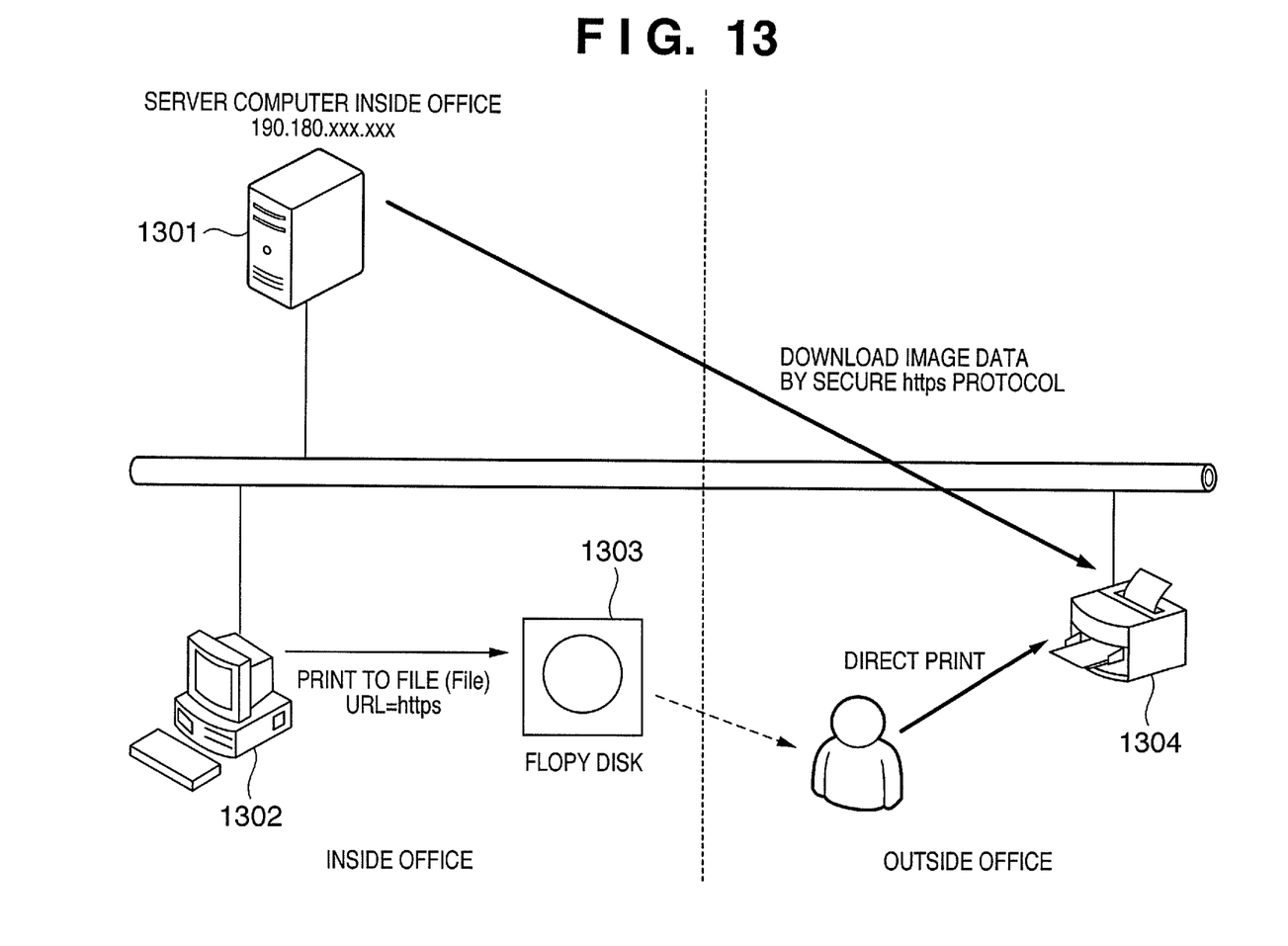
FIG. 13 shows the print flow when "FILE" is selected as a printer port.

FIG. 13 shows the print flow when "FILE" is selected as the printer port. "FILE" is selected as the printer port when print data with a job ticket is temporarily saved in a removable storage medium such as a USB memory or DVD-RAM, as described above. That is, the contents of that medium may be printed from a printer outside the office, e.g., from a color printer in a convenience store. When print processing is executed on the client computer 702 while selecting "FILE" as the printer port, the "https://" protocol with encryption is described in the protocol field of a job ticket. When this storage medium is directly inserted into the color printer in the convenience store or the like, an image file described in the job ticket is downloaded from the server computer inside the office using the "https://" protocol with high security, and is printed. Therefore, print processing with high confidentiality can be implemented.

As described in the above embodiment, when a computer prints heavy data such as an image in a server, it does not embed that image data in print data, but it outputs a job ticket that describes only link information (URL) to that data to a printer. At this time, the computer determines if a port as an output destination of the job ticket indicates inside or outside the office, or includes the possibility of outside the office. Based on this determination result, the computer automatically switches whether HTTP or more secure HTTPS is set in the URL (Uniform Resource Locator) of the image data. As a result, a printing system which can simultaneously attain high convenience and high security without modifying an original file can be provided.

In this embodiment, the subset address of an IP address inside the office is set to be 190.180.xxx.xxx, but it is merely an example. A relatively large corporation has several subnet addresses, and these subnet addresses may be registered in advance in the printer driver to identify whether the address indicates inside or outside the office (associated company or not).

In the above embodiment, an image file has been exemplified as an object to be printed. However, the present invention is not limited to the image file, and the object to be printed may be a general document file as long as it has a format that can be interpreted by the controller of the printer.

In the above embodiment, the printer is described as an apparatus which receives the job ticket transmitted from the client computer. However, such receiving apparatus may be a personal computer which has a locally connected normal printer, and functions as a print server.

As can be understood from the description of the above embodiment, the processing as a characteristic feature of this embodiment can be implemented by the printer driver (one of computer programs) which runs on the client computer. Therefore, the scope of the present invention also includes the computer program. Normally, the computer program is stored in a computer readable storage medium such as a CD-ROM or the like, and is ready to run when the storage medium is set in a computer and the program stored in the storage medium is copied or installed in the system. Therefore, the scope of the present invention also includes such computer readable storage medium.

As described above, according to the present invention, depending on as to whether or not a printer as a print output destination is included in network segments, that printer is controlled to download using one of a nonsecure or secure protocol. Therefore, a printing system which can attain high convenience and high security at the same time can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-231167 filed on Aug. 9, 2005, which is hereby incorporated by reference herein in its entirety.

What is claimed is:

1. An information processing apparatus which outputs a job ticket, comprising:
   a determination unit that determines whether or not a target printer is located within a network segment to which a server belongs, where the server stores a data file to be printed and the target printer acquires from the server the data file to print the data file, and determines whether or not the job ticket is to be outputted into a removable storage medium; and
   a generation unit that,
      if the determination unit determines that the job ticket is not to be outputted into the removable storage medium and determines that the target printer is located within the network segment to which the server belongs, generates a job ticket which describes a file name with a path in the server of the data file and describes an instruction for downloading the data file using a non-secure protocol,
      while, if the determination unit determines that the job ticket is to be outputted into the removable storage medium, or, determines that the target printer is not located within the network segment to which the server belongs, generates a job ticket which describes a file name with a path in the server of the data file and describes an instruction for downloading the data file using a secure protocol,
   wherein the target printer acquires, from the server, the data file specified by the file name with the path described in the job ticket generated by said generation unit and by using either the non-secure or secure protocol in accordance with the instruction described in the generated job ticket.

2. A method for outputting a job ticket by an information processing apparatus, the method comprising:
   determining whether or not a target printer is located within a network segment to which a server belongs, where the server stores a data file to be printed and the target printer acquires from the server the data file to print the data file, and whether or not the job ticket is to be outputted into a removable storage medium; and
   generating
      a job ticket which describes a file name with a path in the server of the data file and describes an instruction for downloading the data file using a non-secure protocol if it is determined in the determining step that the job ticket is not to be outputted into the removable storage medium and that the target printer is located within the network segment to which the server belongs, or
      a job ticket which describes a file name with a path in the server of the data file and describes an instruction for downloading the data file using a secure protocol, if it is determined in the determining step that the job ticket is to be outputted into the removable storage medium or that the target printer is not located within the network segment to which the server belongs,
   wherein the target printer acquires, from the server, the data file specified by the file name with the path described in the job ticket generated at the generating step and by using either the non-secure or secure protocol in accordance with the instruction described in the generated job ticket.

3. A non-transitory computer-readable storage medium for storing a program which causes a computer to execute a method for outputting a job ticket, the method comprising:
   determining whether or not a target printer is located within a network segment to which a server belongs, where the server stores a data file to be printed and the target printer acquires from the server the data file to print the data file, and whether or not the job ticket is to be outputted into a removable storage medium; and
   generating
      a job ticket which describes a file name with a path in the server of the data file and describes an instruction for downloading the data file using a non-secure protocol if it is determined in the determining step that the job ticket is not to be outputted into the removable storage medium and that the target printer is located within the network segment to which the server belongs, or
      a job ticket which describes a file name with a path in the server of the data file and describes an instruction for downloading the data file using a secure protocol, if it is determined in the determining step that the job ticket is to be outputted into the removable storage medium or that the target printer is not located within the network segment to which the server belongs,
   wherein the target printer acquires, from the server, the data file specified by the file name with the path described in the job ticket generated at the generating step and by using either the non-secure or secure protocol in accordance with the instruction described in the generated job ticket.

4. The apparatus according to claim 1, further comprising:
   an acquisition unit that acquires information related to a printer port to which the target printer is assigned, wherein the determination unit, based on the printer port information acquired by the acquisition unit, determines whether or not the target printer is located within the network segment to which the server belongs, where the server stores the data file to be printed and the target printer acquires from the server the data file to print the data file and determines whether or not the job ticket is to be outputted into the removable storage medium.

5. The method according to claim 2, further comprising:
   acquiring information related to a printer port to which the target printer is assigned, wherein in the determining step, it is determined, based on the acquired printer port information, whether or not the target printer is located within a network segment to which the server belongs, where the server stores the data file to be printed and the target printer acquires from the server the data file to print the data file, and whether or not the job ticket is to be outputted into a removable storage medium.

6. The method according to claim 3, wherein the method further comprises:
   acquiring information related to a printer port to which the target printer is assigned, wherein in the determining step, it is determined, based on the acquired printer port information, whether or not the target printer is located within a network segment to which the server belongs, where the server stores the data file to be printed and the target printer acquires from the server the data file to print the data file, and whether or not the job ticket is to be outputted into a removable storage medium.

* * * * *